United States Patent
Akasaka et al.

(10) Patent No.: US 10,349,154 B2
(45) Date of Patent: Jul. 9, 2019

(54) INTRA DATA CENTER OPTICAL SWITCHING

(71) Applicant: Fujitsu Limited, Kawasaki-shi, Kanagawa (JP)

(72) Inventors: Youichi Akasaka, Plano, TX (US); Tadashi Ikeuchi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 114 days.

(21) Appl. No.: 15/695,801

(22) Filed: Sep. 5, 2017

(65) Prior Publication Data

US 2019/0075378 A1   Mar. 7, 2019

(51) Int. Cl.
*H04J 14/00* (2006.01)
*H04Q 11/00* (2006.01)
*H04J 14/02* (2006.01)

(52) U.S. Cl.
CPC ...... *H04Q 11/0005* (2013.01); *H04J 14/0212* (2013.01); *H04Q 11/0062* (2013.01); *H04Q 2011/009* (2013.01); *H04Q 2011/0009* (2013.01); *H04Q 2011/0016* (2013.01)

(58) Field of Classification Search
CPC .......... H04Q 11/0066; H04Q 11/0067; H04Q 11/0062; H04Q 11/0005; H04Q 11/0003; H04J 14/02; H04J 14/0267; H04J 14/0212; H04L 27/2601; H04L 49/356; G02B 6/3546; G02B 6/3548; G02B 6/3558; G02B 6/3556
USPC ........ 398/45, 48, 49, 46, 47, 51, 54, 55, 56, 398/57, 58, 59, 79, 83, 158, 159; 385/24, 385/37, 16, 17, 18; 370/352, 392, 389, 370/468, 254, 225, 228
See application file for complete search history.

(56) References Cited

U.S. PATENT DOCUMENTS

| | | | | |
|---|---|---|---|---|
| 2012/0099863 | A1* | 4/2012 | Xu | H04Q 11/0005 398/49 |
| 2014/0334818 | A1* | 11/2014 | Mehrvar | H04Q 11/0066 398/51 |

OTHER PUBLICATIONS

International Telecommunication Union, "Interfaces for the Optical Transport Network" ITU-T G.709/Y.1331 (Jun. 2016); 244 pages.
International Telecommunication Union, "Architecture of Optical Transport Networks" ITU-T G.872 (Jan. 2017); 68 pages.

* cited by examiner

*Primary Examiner* — Hanh Phan
(74) *Attorney, Agent, or Firm* — Baker Botts L.L.P.

(57) ABSTRACT

Methods and systems for intra data center optical switching of optical signals use an intra data center optical switch to optically transmit N optical wavelengths as an optical signal transmitting a data stream generated by a data center system included within N data center systems. The data center system may selectively receive one of N−1 optical wavelengths as another optical signal corresponding to one of N−1 other data center systems excluding the data center system from the intra data center optical switch. In this manner, intra data center optical switching may be performed without utilizing Ethernet and optical switches, which may result in reduced power consumption for data center communication.

20 Claims, 6 Drawing Sheets

INTRA DATA CENTER OPTICAL SWITCHING

BACKGROUND

Field of the Disclosure

The present disclosure relates generally to optical communication networks and, more particularly, to intra data center optical switching.

Description of the Related Art

Telecommunications systems, cable television systems and data communication networks use optical networks to rapidly convey large amounts of information between remote points. In an optical network, information is conveyed in the form of optical signals through optical fibers. Optical networks may also include various network nodes such as amplifiers, dispersion compensators, multiplexer/demultiplexer filters, wavelength selective switches, couplers, etc. to perform various operations within the network.

In particular, optical networks may be reconfigured to transmit different individual channels using, for example, optical add-drop multiplexers (OADMs). In this manner, individual channels (e.g., wavelengths) may be added or dropped at various points along an optical network, enabling a variety of network configurations and topologies.

Furthermore, typically, an optical network switch is used to centrally perform electrical switching of the sub-channels carried within an optical signal to different destinations.

SUMMARY

In one aspect, a disclosed intra data center optical switching system may include a first optical comb, a wavelength exchanger, and a first tunable filter. The intra data center optical switching system may also include a number of N data center systems including a first data center system exclusively associated with the first optical comb and the first tunable filter, where N may be greater or equal to two. The first data center system may generate a first data stream. The first data center system may also transmit a first optical signal transmitting the first data stream to the first optical comb, the first optical comb may generate N optical wavelengths onto a second optical signal. Each of the N optical wavelengths may transmit the first data stream. The first data center system may further receive a fourth optical signal from the first tunable filter. The first tunable filter may receive N−1 optical wavelengths as a third optical signal from a wavelength exchanger that may receive the second optical signal. The first tunable filter may also filter the third optical signal to selectively output one of the N−1 optical wavelengths onto the fourth optical signal. The N−1 optical wavelengths may correspond to N−1 data center systems excluding the first data center system.

In any of the disclosed embodiments of the intra data center optical switching system, the wavelength exchanger may receive N optical signals, including the second optical signal, respectively from N optical combs respectively associated with the N data center systems.

In any of the disclosed embodiments of the intra data center optical switching system, the first data center system may receive the fourth optical signal and generate a second data stream corresponding to the fourth optical signal.

In any of the disclosed embodiments of the intra data center optical switching system, each of the N−1 optical wavelengths may transmit each of N−1 data streams that may correspond to N−1 data center systems excluding the first data center system.

In any of the disclosed embodiments of the intra data center optical switching system, the third optical signal may include at least some of the same wavelengths as included in the second optical signal.

In any of the disclosed embodiments of the intra data center optical switching system, the first data center system may receive an indication of a value for N for optical switching and may receive another indication of the other N−1 data center systems.

In any of the disclosed embodiments of the intra data center optical switching system, an optical switch controller may control N tunable filters including the first tunable filter.

In any of the disclosed embodiments of the intra data center optical switching system, the first tunable filter may be a liquid crystal tunable filter.

In any of the disclosed embodiments of the intra data center optical switching system, the first optical comb may include at least one of a multiple distributed laser bank and a frequency comb generator.

In any of the disclosed embodiments of the intra data center optical switching system, the wavelength exchanger may include an arrayed waveguide grating and a liquid crystal on silicon.

In any of the disclosed embodiments of the intra data center optical switching system, the wavelength exchanger may include a wavelength selective switch.

In another aspect, a disclosed method for intra data center optical switching may include generating a first data stream at a first data center system included within a number of N data center systems. The first data center system may be exclusively associated with a first optical comb and a first tunable filter, and N is greater or equal to two. The method may also include transmitting at the first data center system a first optical signal transmitting the first data stream to the first optical comb. The first optical comb may generate N optical wavelengths onto a second optical signal. Each of the N optical wavelengths may transmit the first data stream. The method may also include receiving a fourth optical signal from the first tunable filter. The first tunable filter may receive N−1 optical wavelengths as a third optical signal from a wavelength exchanger that may receive the second optical signal. The first tunable filter may also filter the third optical signal to selectively output one of the N−1 optical wavelengths onto the fourth optical signal. The N−1 optical wavelengths may correspond to N−1 data center systems excluding the first data center system.

In any of the disclosed embodiments of the method, the wavelength exchanger may further receive N optical signals, including the second optical signal, respectively from N optical combs respectively associated with the N data center systems.

In any of the disclosed embodiments of the method, the method may include receiving the fourth optical signal and generating a second data stream corresponding to the fourth optical signal.

In any of the disclosed embodiments of the method, each of the N−1 optical wavelengths may transmit each of N−1 data streams corresponding to N−1 data center systems excluding the first data center system.

In any of the disclosed embodiments of the method, the third optical signal may include at least some of the same wavelengths as included in the second optical signal.

In any of the disclosed embodiments of the method, the method may also include receiving an indication of a value for N for optical switching and receiving another indication of the other N−1 data center systems.

In any of the disclosed embodiments of the method, an optical switch controller may control N tunable filters including the first tunable filter.

In any of the disclosed embodiments of the method, the first tunable filter may be a liquid crystal tunable filter.

In any of the disclosed embodiments of the method, the first optical comb may include at least one of a multiple distributed laser bank and a frequency comb generator.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Figure 1:
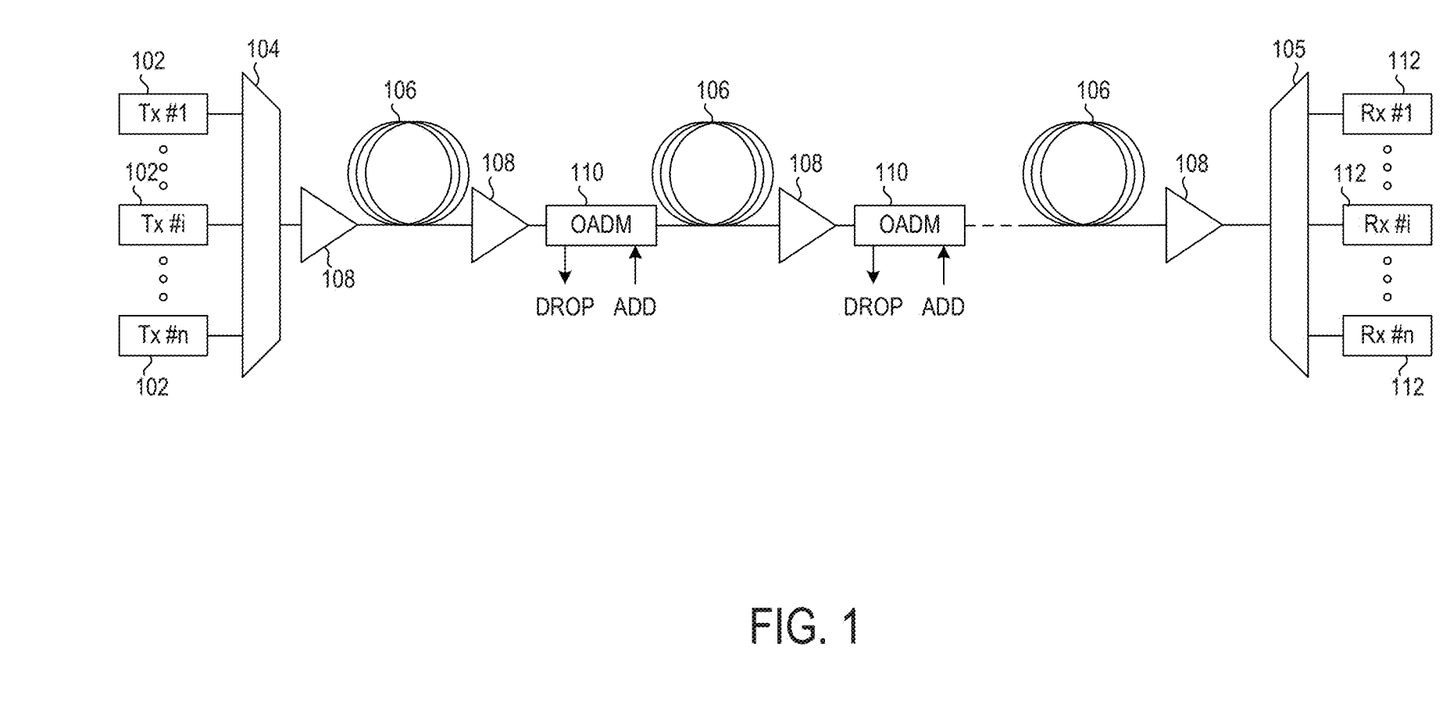
FIG. 1 is a block diagram of selected elements of an embodiment of an optical transport network (OTN)

Turning now to the drawings, FIG. 1 illustrates an example embodiment of an optical transport network 101, which may represent an optical communication system. Optical transport network 101 may include one or more optical fibers 106 configured to transport one or more optical signals communicated by components of optical transport network 101. The network elements of optical transport network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical transport network 101 may comprise a point-to-point optical network with terminal nodes, a ring optical network, a mesh optical network, or any other suitable optical network or combination of optical networks. Optical fibers 106 comprise thin strands of glass capable of communicating the signals over long distances with very low loss. Optical fibers 106 may comprise a suitable type of fiber selected from a variety of different fibers for optical transmission.

Optical transport network 101 may include devices configured to transmit optical signals over optical fibers 106. Information may be transmitted and received through optical transport network 101 by modulation of one or more wavelengths of light to encode the information on the wavelength. In optical networking, a wavelength of light may also be referred to as a channel. Each channel may be configured to carry a certain amount of information through optical transport network 101.

To increase the information capacity and transport capabilities of optical transport network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical transport network 101 may be configured to transmit disparate channels using WDM or some other suitable multi-channel multiplexing technique, and to amplify the multi-channel signal.

Optical transport network 101 may include one or more optical transmitters (Tx) 102 configured to transmit optical signals through optical transport network 101 in specific wavelengths or channels. Transmitters 102 may comprise a system, apparatus or device configured to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical transport network 101.

Multiplexer 104 may be coupled to transmitters 102 and may be a system, apparatus or device configured to combine the signals transmitted by transmitters 102, e.g., at respective individual wavelengths, into a WDM signal.

Optical amplifiers 108 may amplify the multi-channeled signals within optical transport network 101. Optical amplifiers 108 may be positioned before and after certain lengths of fiber 106. Optical amplifiers 108 may comprise a system, apparatus, or device configured to amplify optical signals. For example, optical amplifiers 108 may comprise an optical repeater that amplifies the optical signal. This amplification may be performed with opto-electrical (O-E) or electro-optical (E-O) conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA).

OADMs 110 may be coupled to optical transport network 101 via fibers 106. OADMs 110 comprise an add/drop module, which may include a system, apparatus or device configured to add or drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination.

In certain embodiments of optical transport network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (not shown) that may be included in a ROADM.

As shown in FIG. 1, optical transport network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical transport network 101 may transmit and carry a forty (40) channel DWDM signal. Demultiplexer 105 may divide the single, forty channel DWDM signal into forty separate signals according to the forty different channels.

In FIG. 1, optical transport network 101 may also include receivers 112 coupled to demultiplexer 105. Each receiver 112 may be configured to receive optical signals transmitted at a particular wavelength or channel, and may process the optical signals to obtain (e.g., demodulate) the information (i.e., data) that the optical signals contain. Accordingly, network 101 may include at least one receiver 112 for every channel of the network.

Optical networks, such as optical transport network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant. Additionally, polarization division multiplexing (PDM) technology may enable achieving a greater bit rate for information transmission. PDM transmission comprises modulating information onto various polarization components of an optical signal associated with a channel. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical transport network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS), which handles one or more network elements from the perspective of the elements, a network management system (NMS), which handles many devices from the perspective of the network, and an operational support system (OSS), which handles network-wide operations.

Modifications, additions or omissions may be made to optical transport network 101 without departing from the scope of the disclosure. For example, optical transport network 101 may include more or fewer elements than those depicted in FIG. 1. Also, as mentioned above, although depicted as a point-to-point network, optical transport network 101 may comprise any suitable network topology for transmitting optical signals such as a ring, a mesh, or a hierarchical network topology.

As discussed above, the amount of information that may be transmitted over an optical network may vary with the number of optical channels coded with information and multiplexed into one signal. Accordingly, an optical fiber employing a WDM signal may carry more information than an optical fiber that carries information over a single channel. Besides the number of channels and number of polarization components carried, another factor that affects how much information can be transmitted over an optical network may be the bit rate of transmission. The higher the bit rate, the greater the transmitted information capacity. Achieving higher bit rates may be limited by the availability of wide bandwidth electrical driver technology, digital signal processor technology and increase in the required OSNR for transmission over optical transport network 101.

As shown in FIG. 1, optical transport network 101 may employ a digital wrapper technology to encapsulate existing frames of data, which may originate in a variety of native protocols, and may add packetized overhead for addressing, management, and quality assurance purposes. The resulting optical signal, in the form of optical data units (ODUs) may then be transported using individual optical wavelengths by optical transport network 101. The packetized overhead may be used to monitor and control the optical signals being transported using any of a variety of different protocols. In particular embodiments, operation of optical transport network 101 is performed according to optical transport networking (OTN) standards or recommendations promulgated by the International Telecommunications Union (ITU), such as ITU-T G.709—"Interfaces for the Optical Transport Network" and ITU-T G.872—"Architecture of the Optical Transport Network", among others. The optical wavelengths in OTN may rely on a hierarchical implementation of time-division multiplexing (TDM) to optimize carrier wavelength efficiency.

As a result of the hierarchical TDM arrangement of the optical signals in OTN, OTN switching may be performed at different sub-wavelength bit rates along optical transport network 101. As used herein, OTN switching refers to switching ODU paths of different bit rates with the ODU being the atomic unit of switching. In contrast, Internet protocol (IP) switching, such as by an IP router, refers to switching of network signals where an individual IP packet is the atomic unit of switching. In OTN switching, such as in optical transport network 101, an ODU remains in the optical domain outside of an OTN switch from network ingress to network egress. Within the OTN switch, an ODU may be accessed as an electrical domain object and OTN switching may include electrical switching technology.

It is noted that while OTN switching does generally take place in the DWDM domain, ROADMs and DWDM may be formally referred to as layer0 technologies (in The Basic Reference Model for Open Systems Interconnection, also referred to as the OSI Reference Model). In contrast, OTN may be described as a layer1 technology in the OSI Reference Model, which may operate independently of the optical wavelength domain (DWDM). For example, an OTN switch may theoretically operate over dark fiber, galvanic conductors (such as copper), or over a wireless medium (such as a millimeter-scale wave, or radio frequencies).

As will be described in further detail herein, methods and systems are disclosed for intra data center optical switching.

A typical data center may include multiple data center systems and a data center network, where the multiple data center systems may be server systems. The data center network may include one or more of an optical transport network having one or more layers of optical switches, such as optical transport network 101, and an Ethernet network having one or more layers of Ethernet switches that the multiple data center systems use for data center network communication. When the data center systems communicate information with each other, intra data center optical switching, or outside the data center, external data center communication, the information may be transmitted through the one or more layers of the optical switches and the one or more layers of the Ethernet switches. In the typical data center, the number of data center systems, e.g. server systems, may be a few thousand or more and the power consumption of the optical switches and the Ethernet switches may represent a significant amount of the total power consumption of the data center and may be approaching a power limit of the data center. In some data centers, most of the data center network communication may be the intra data center optical switching, which may account for a significant amount of the overall data center power consumption.

In contrast to the typical data center network, which may utilize one or more layers of optical switches and one or more layers of Ethernet switches, an intra data center optical switching system is disclosed herein. The intra data center optical switching system disclosed herein may enable intra data center optical switching of optical signals transmitting data streams between a number N data center systems, without the use of the one or more layers of optical switches and the one or more layers of Ethernet switches, where N may be any integer value greater than 2. The intra data center optical switching system disclosed herein may enable a significant reduction in the data center power consumption, because the one or more layers of optical switches and the one or more layers of Ethernet switches are not required and may be eliminated from the intra data center optical switching system. By significantly reducing the data center power consumption and eliminating the one or more layers of optical switches and the one or more layers of Ethernet switches from the intra data center optical switching system, the costs of operating the data center may be reduced.

The intra data center optical switching system disclosed herein may be implemented using a number N data center systems including a first data center system for intra data center optical switching of optical signals transmitting data streams using an intra data center optical switch. The intra data center optical switch may include a first optical comb, a wavelength exchanger, and a first tunable filter. The first data center system may be exclusively associated with the first optical comb and the first tunable filter and may generate a first data stream and may also transmit a first optical signal transmitting the first data stream to the first optical comb. The first optical comb may generate N different optical wavelengths onto a second optical signal. The wavelength exchanger may receive the second optical signal from the first optical comb. The first tunable filter may receive N−1 different optical wavelengths as a third optical signal from the wavelength exchanger and may filter the third optical signal to selectively output one of the N−1 different optical wavelengths onto a fourth optical signal. The N−1 different optical wavelengths may correspond to N−1 data center systems excluding the first data center system. The first data center system may receive a fourth optical signal from the first tunable filter. The N−1 different optical wavelengths may correspond to N−1 data center systems excluding the first data center system. In this manner, each of the N data center systems may communicate with each of the other N−1 data center systems, which may result in N:N intra data center optical switch communication.

Figure 2:
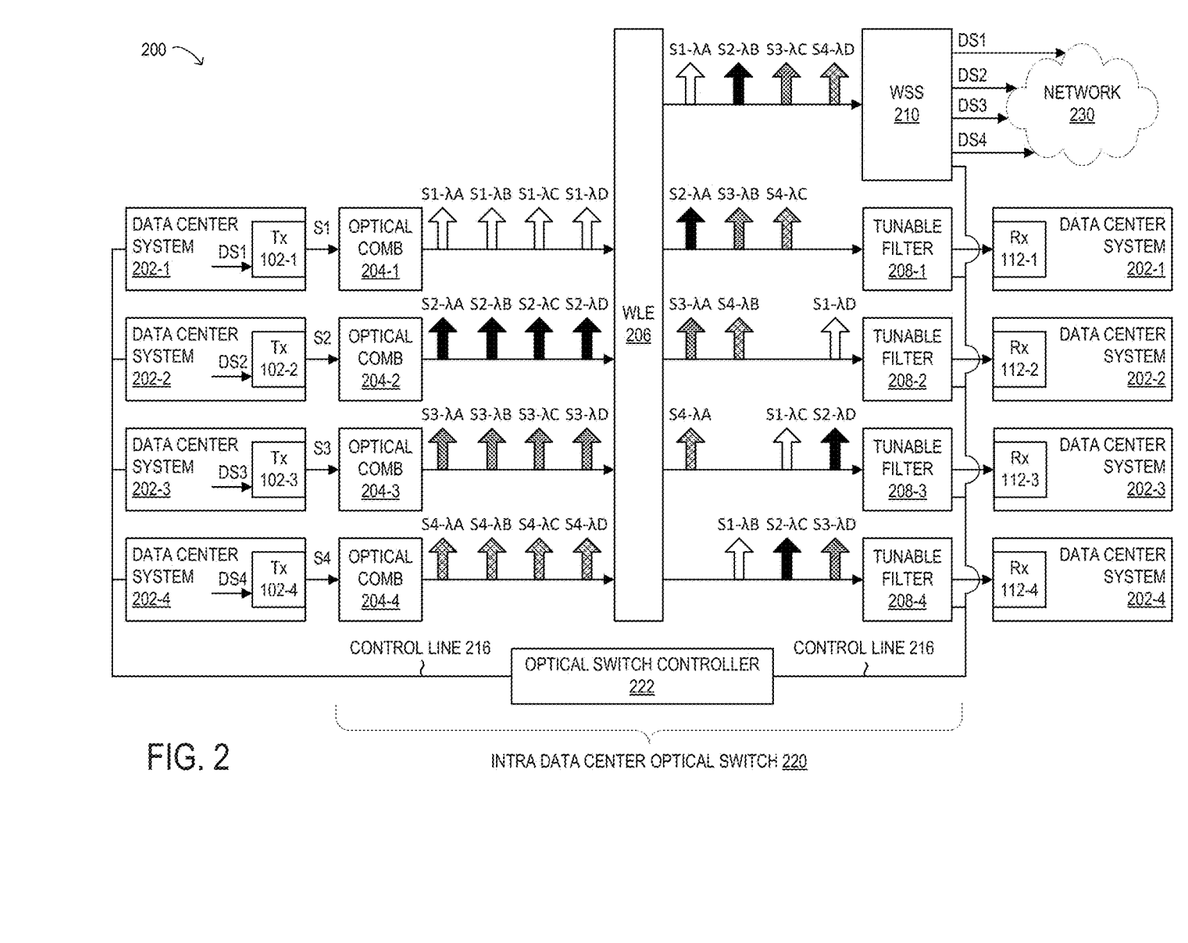
FIG. 2 is a block diagram of selected elements of an embodiment of an intra data center optical switching system.

Referring now to FIG. 2, a block diagram of selected elements of an embodiment of an intra data center optical switching system 200 is illustrated. In FIG. 2, intra data center optical switching system 200 may be implemented for intra data center optical switching and is shown in a schematic representation and is not drawn to scale or perspective. Intra data center optical switching refers to switching of optical signals transmitting data streams between data center systems of a data center. It is noted that, in different embodiments, intra data center optical switching system 200 may be operated with additional or fewer elements.

As shown in FIG. 2, components of intra data center optical switching system 200 may include, but are not limited to, 4 data center systems 202 including data center systems 202-1, 202-2, 202-3, and 202-4, an intra data center optical switch 220, and a network 230. Each data center system 202-1, 202-2, 202-3, and 202-4 may include an optical transmitter 102 and an optical receiver 112 including respective optical transmitters 102-1, 102-2, 102-3, and 102-4 and respective optical receivers 112-1, 112-2, 112-3, and 112-4. Intra data center optical switch 220 may include 4 optical combs 204 including optical combs 204-1, 204-2, 204-3, and 204-4, a wavelength exchanger (WLE) 206, 4 tunable filters 208 including tunable filters 208-1, 208-2, 208-3, and 208-4, a wavelength selective switch (WSS) 210, and an optical switch controller 222. Each of the 4 optical combs 204 may be coupled to a corresponding one of the 4 data center systems 202 and wavelength exchanger 206. Wavelength exchanger 206 may also be coupled to each of the 4 tunable filters 208, and WSS 210. Each of the 4 tunable filters 208 may also be coupled to a corresponding one of the 4 data center systems 202. Optical switch controller 222 may be coupled to the 4 data center systems 202, the 4 tunable filters 208 via control line 216, and WSS 210. WSS 210 may also be coupled to network 230. In some embodiments, network 230 may also be coupled to data center systems 202 and optical switch controller 222. As shown in FIG. 2, intra data center optical switching system 200 may support 4:4 intra data center optical switch communication, which refers to the ability of each of the 4 data center systems 202 to communicate with each of the other 3 data center systems 202. The N data center systems 202 may be exclusively associated with each of the corresponding N optical combs 204 and each of the corresponding N tunable filters 208.

Each data center system 202 of the N data center systems may be a server system, a network processing element, a network processing node, or another type of data center system. Data center system 202-1 may be configured to generate a corresponding data stream 1 (DS1) and transmit a first optical signal S1 transmitting DS1 to one or more destination data center systems 202 excluding data center system 202-1 using intra data center optical switch 220. In particular, data center system 202-1 may communicate destination information including identifier information associated with each of the one or more destination data center systems 202 to receive the first optical signal S1 and timing information to optical switch controller 222 via control line 216. The timing information may include a starting time and a duration indicating when the one or more destination data center systems 202 may receive the first optical signal S1 and its duration. Responsive to receiving the one or more destination data center systems 202 identifier information and the associated timing information, optical switch controller 222 may tune each tunable filter 208 exclusively associated with one of the one or more destination data center systems 202 to one of one or more specified optical wavelengths associated with the first optical signal S1. Tuning each tunable filter 208 may be further based on the associated timing information. Tuning each tunable filter 208 may enable each tunable filter 208 to selectively output the first optical signal S1 to the corresponding one of the one or more destination data center systems 202. This may enable data center system 202-1 to dynamically route the first optical signal to each of the one or more destination data center systems 202. By tuning each tunable filter 208 in a similar manner, optical switch controller 222 may control the N tunable filters 208 including tunable filters 208-1, 208-2, 208-3, and 208-4. In one or more embodiments, optical switch controller 222 may send the one of the one or more specified optical wavelengths and the associated timing information associated with each data center system 202 to each of the one or more destination data center systems 202 so that each destination data center system 202 may tune its corresponding tunable filter 208. Optical switch controller 222 may also send a different one of N different optical wavelengths and the timing information associated with each of N data center systems 202 to WSS 210 so that WSS 210 may be configured to receive each different optical signal associated with each of the N data center systems 202 and its corresponding starting time and duration, described in further detail below. In some embodiments, intra data center optical switch 220 may include a number M WSSs 210, where M has a value of 2 or more. Each of the M WSSs 210 may be configured to receive at least one different optical signal associated with each of the N data center system 202 and the corresponding starting times and durations, which together may be configured to receive all of the N different optical signals. As shown in FIG. 2, WSS 210 is configured to receive S1-λA, S2-λ13, S3-λC, and S4-XD, where N is equal to 4 and M is equal to 1. Data center system 202-1 may be configured to transmit the first optical signal S1 to the corresponding optical comb 204-1 via optical transmitter 102-1. Each of the other data center systems 202 may be configured similarly, where data center system 202-2 may be configured to transmit optical signal S2 to optical comb 204-2 via optical transmitter 102-2, data center system 202-3 may be configured to transmit optical signal S3 to optical comb 204-3 via optical transmitter 102-3, and data center system 202-4 may be configured to transmit optical signal S4 to optical comb 204-4 via optical transmitter 102-4. Similarly, each of the other data center systems 202 may communicate their destination data center systems 202 identifier information and associated timing information to optical switch controller 222 so that each tunable filter 208 corresponding to their destination data center systems 202 may be tuned.

In one or more embodiments, data center system 202-1 may receive an indication of a value for N for optical switching and may receive another indication of the other N−1 data center systems 202. The indication of the value for N and the other indication of the other N−1 data center systems 202 may be sent from optical switch controller 222 and may allow data center system 202-1 to determine the total number of data center systems 202 utilizing intra data center optical switch 220 and the other N−1 data center systems 202 that may be a source data center system 202 or a destination data center system 202 of data center communication.

Each of the 4 optical combs 204 may include at least one of a multiple distributed laser bank and a frequency comb generator, or another type of multiple frequency generator. Optical comb 204-1 may be configured to receive the first optical signal S1 from data center system 202-1. Optical comb 204-1 may generate a frequency comb having 4 different optical wavelengths including optical wavelengths λA, λB, λC, and λD onto a second optical signal. Each of the 4 different optical wavelengths may transmit data stream DS1. Optical comb 204-1 may perform signal coding of the first optical signal S1 before generating the frequency comb or after generating the frequency comb. Optical comb 204-1 may output the second optical signal to wavelength exchanger 206 depicted as S1-λA, S1-LB, S1-λC, and S1-λD in FIG. 2. Each of the other optical combs 204 may be configured similarly, where optical comb 204-2 may be configured to receive optical signal S2 from data center system 202-2 and output the corresponding output optical signal to wavelength exchanger 206 depicted as S2-λA, S2-λB, S2-λC, and S2-λD. Optical comb 204-3 may be configured to receive optical signal S3 from data center system 202-3 and output the corresponding output optical signal to wavelength exchanger 206 depicted as S3-λA, S3-λB, S3-λC, and S3-λD. Optical comb 204-4 may be configured to receive optical signal S4 from data center system 202-4 and output the corresponding output optical signal to wavelength exchanger 206 depicted as S4-λA, S4-λB, S4-λC, and S4-λD.

Wavelength exchanger 206 may include an arrayed waveguide grating and a liquid crystal on silicon, and a WSS. The WSS may be a 4 degree WSS, or a custom device for a given N. Wavelength exchanger 206 may be configured to receive 4 input optical signals, including the second optical signal, respectively from the 4 optical combs 204 exclusively associated with the 4 data center systems 202. Each of the 4 input optical signals having the 4 different optical wavelengths including optical wavelengths λA, λB, λC, and λD.

Wavelength exchanger 206 may also be configured to, for each of the 4 different optical wavelengths in each of the 4 input optical signals, selectively guide a different one of the 4 different optical wavelengths in each of the 4 input optical signals onto 4 different output optical signals corresponding to the 4 data center systems 202 excluding the different one of the 4 different optical wavelengths in the input optical signal corresponding to the same data center system 202 that corresponds to the different output optical signal. As such, each of the 4 different output optical signals includes 3 different optical wavelengths. Wavelength exchanger 206 may also be configured to output the 4 different output optical signals having the 3 different optical wavelengths, including a third optical signal exclusively associated with data center system 202-4, to each of the corresponding tunable filters 208. As shown in FIG. 2, wavelength exchanger may be configured to output S2-λA, S3-λB, and S4-λC to tunable filter 208-1. Similarly, wavelength exchanger 206 may be configured to output S3-λA, S4-λB, and S1-λD to tunable filter 208-2, output S1-λC, and S2-λD to tunable filter 208-3, and output S1-λB, S2-λC, and S3-λD to tunable filter 208-4. Each of the 3 different optical wavelengths in each of the 4 different output optical signals may transmit each of the 3 data streams that may correspond to the 3 data center systems 202 excluding the data center system 202 that corresponds to the output signal. Each corresponding output optical signal may include one of the same wavelengths as included in each of the 4 optical signals from the 4 optical combs 204. Wavelength exchanger 206 may be also configured to output S1-λA, S3-λC, and S4-λD to WSS 210. WSS 210 may transmit these optical signals to another network, e.g. network 230, which may be a network that is external to the data center.

Each of the tunable filters 208 may be a tunable laser, or another type of tunable filter. Each tunable filter 208 may be configured to receive the 3 different optical wavelengths in its corresponding input optical signal from wavelength exchanger 206, including the third optical signal corresponding to tunable filter 208-4. Each tunable filter 208 may be configured to filter its corresponding input optical signal to selectively output one of the 3 different optical wavelengths onto a corresponding output optical signal, including a fourth optical signal associated with tunable filter 208-4. Each tunable filter 208 has been configured in advance to select a specified wavelength of the 3 different optical wavelengths, as previously described. Each tunable filter 208 may also be configured to output its corresponding output optical signal to the data center system 202 exclusively associated with it. As shown in FIG. 2, tunable filter 208-4 may receive the third optical signal S1-λB, S2-λC, and S3-λD, may filter the third optical signal to selectively output one of the 3 different optical wavelengths onto the fourth optical signal, and output the fourth optical signal to data center system 202-4, such as for example S1-λB. Similarly, tunable filters 208-1, 208-2, and 208-3 may each filter their corresponding input optical signal and may output their corresponding output signal to their corresponding data center system 202. For example, tunable filter 208-1 may receive S2-λA, S3-λB, and S4-λC, and may output optical signal S4-λC to data center system 202-1. Tunable filter 208-2 may receive S3-λA, S4-λB, and S1-λD, and may output optical signal S3-λA to data center system 202-2. Tunable filter 208-3 may receive S4-λA, S1-λC, and S2-λD, and may output optical signal S2-λD to data center system 202-3.

Each data center system 202 may also be configured to receive a corresponding input optical signal having a specified wavelength from its corresponding tunable filter 208. For example, data center system 202-1 may be configured to receive the optical signal S4-λC from tunable filter 208-1 via optical receiver 112-1. Each of the other data center systems 202 may be configured similarly, where data center system 202-2 may be configured to receive the optical signal S3-λA from tunable filter 208-2 via optical receiver 112-2. Data center system 202-3 may be configured to receive the optical signal S2-λD from tunable filter 208-3 via optical receiver 112-3. Data center system 202-4 may be configured to receive the optical signal S1-λB from tunable filter 208-4 via optical receiver 112-4.

In one or more embodiments, each of the N data center systems 202 may generate a data stream corresponding to its corresponding input optical signal. Each of the N data center systems 202 may also be configured to transmit the data stream to a network, e.g. network 230. Each of the N data center systems 202 may further be configured to receive an indication of a value for N for optical switching. Each of the N data center systems 202 may also be configured to receive an indication of the other N−1 data center systems 202. N has a value of 4 in FIG. 2. However, it will be understood that in different implementations of intra data center optical switching system 200, different values for N may be used, such as any positive integer value of N greater than 2.

In one or more embodiments, each data center system 202 may be co-located with the corresponding optical comb 204, the corresponding tunable filter 208, or both. In one or more embodiments, intra data center optical switching system 200 may support multi-casting, where each data center system 202 may transmit a corresponding optical signal 212 to the N−1 other data center systems 202 that may be received by the N−1 other data center systems 202.

During operation, data center system 202-1 may communicate to optical switch controller 222 that data center system 202-4 may receive an optical signal from data center system 202-1. In response, optical switch controller 222 may tune tunable filter 208-4 to a specified optical wavelength associated with the optical signal, such as, for example, optical wavelength λB associated with optical signal S1, to cause intra data center optical switch 220 to route optical signals transmitted from data center system 202-1 to data center system 202-4.

Data center system 202-1 may generate a first data stream DS1 and may transmit the corresponding first optical signal S1 to optical comb 204-1. Optical comb 204-1 may receive the first optical signal S1 and generate 4 different optical wavelengths λA, λB, λC, and λD onto a second optical signal. Optical comb 204-1 may output the second optical signal to wavelength exchanger 206.

Wavelength exchanger 206 may receive 4 input optical signals, including the second optical signal, respectively from the 4 optical combs 204 exclusively associated with the 4 data center systems 202. Each of the 4 input optical signals may have the 4 different optical wavelengths including optical wavelengths λA, λB, λC, and λD. The 4 input optical signals correspond to the 4 data center systems 202. Wavelength exchanger 206 may output 4 different output optical signals to its corresponding tunable filter 208, including a third optical signal corresponding to tunable filter 208-4. Each output optical signal includes 3 different optical wavelengths excluding the optical wavelength in the input optical signal corresponding to the same data center system 202 that corresponds to the output optical signal.

Tunable filter 208-4 may receive the 3 different optical wavelengths in the third optical signal from wavelength exchanger 206. Tunable filter 208-4 may be previously tuned to optical wavelength λB and selectively output a fourth optical signal S1-λB to data center system 202-4. Each of the other 3 data center systems 202, the optical switch controller 222, each of the other 3 optical combs 204, the wavelength exchanger 206, and each of the other 3 tunable filters 208 operate in a similar manner as data center system 202-1, the optical switch controller 222, optical comb 204-1, wavelength exchanger 206, and tunable filter 208-4 described in detail above.

In this manner, each data center system 202 may transmit a corresponding optical signal 212 to one or more other destination data center systems 204 via intra data center optical switch 220 without using optical or electrical switches enabling N:N intra data center optical switch communication, which refers to the ability of each of the N data center systems to communicate with each of the other N−1 data center systems. As shown in FIG. 2, intra data center optical switching system 200 includes a number N data center systems 202, N optical combs 204, and N tunable filters 208, where N has a value of 4. It will be appreciated that intra data center optical switching system 200 may be structurally similar and operate in a similar manner when N has a value different than 4 and greater than 2, as previously described.

Figure 3:
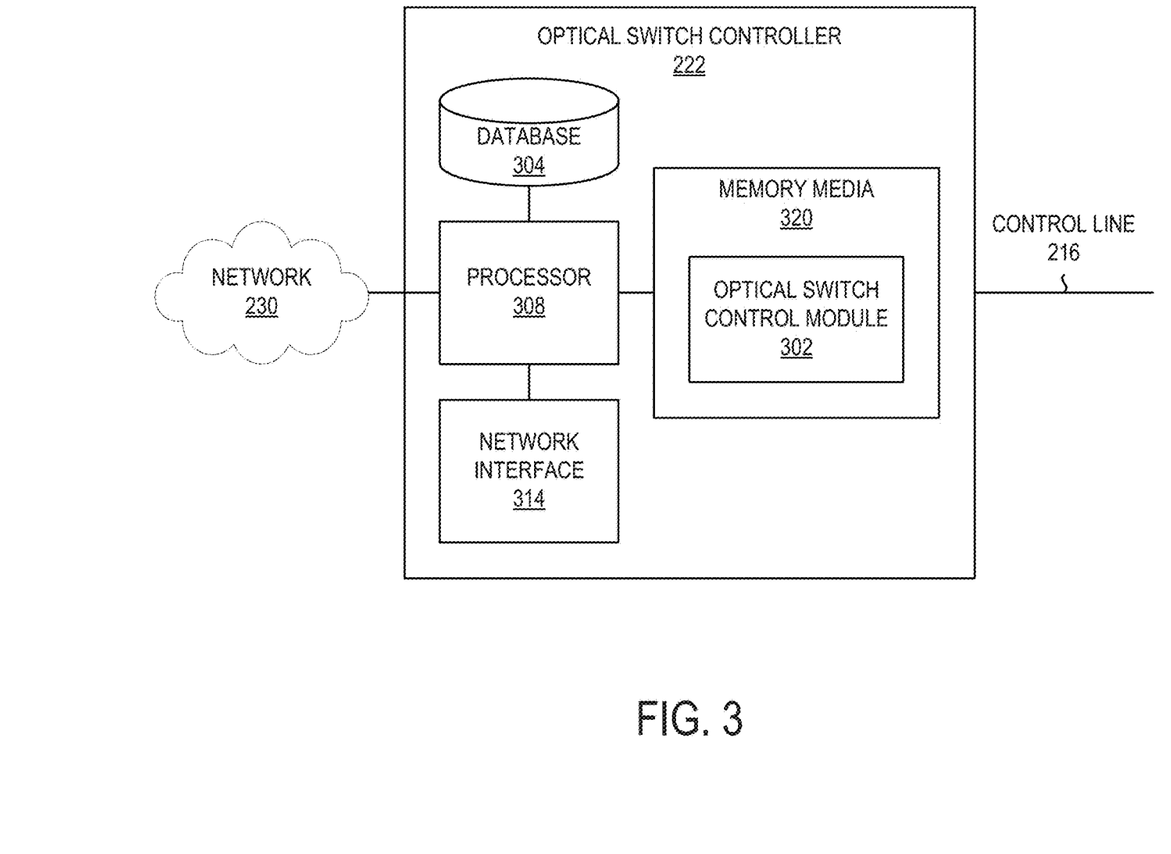
FIG. 3 is a block diagram of selected elements of an embodiment of an optical switch controller.

Referring now to FIG. 3, a block diagram of selected elements of an embodiment of optical switch controller 222 for implementing intra data center optical switching in optical switches, such as, for example, in intra data center optical switch 220 (see FIG. 2), is illustrated. In FIG. 3, optical switch controller 222 is shown in a schematic representation and is not drawn to scale or perspective. It is noted that, in different embodiments, optical switch controller 222 may be operated with additional or fewer elements.

As shown in FIG. 3, optical switch controller 222 includes a processor 308 and memory media 320, which may store executable instructions (i.e., executable code) that may be executable by processor 308, which has access to memory media 320. Processor 308 may execute instructions that cause optical switch controller 222 to perform the functions and operations described herein. For the purposes of this disclosure, memory media 320 may include non-transitory computer-readable media that stores data and instructions for at least a period of time. Memory media 320 may comprise persistent and volatile media, fixed and removable media, and magnetic and semiconductor media. Memory media 320 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. Memory media 320 is operable to store instructions, data, or both. Memory media 320 as shown includes sets or sequences of instructions that may represent executable computer programs, namely, optical switch control module 302.

Also shown included with optical switch controller 222 in FIG. 3 is network interface 314, which may be a suitable system, apparatus, or device operable to serve as an interface between processor 308 and network 230. Network interface 314 may enable optical switch controller 222 to communicate over network 230 using a suitable transmission protocol or standard. In some embodiments, network interface 314 may be communicatively coupled via network 230 to a network storage resource. In some embodiments, network 230 represents at least certain portions of optical transport network 101. Network 230 may also include certain portions of a network using galvanic or electronic media. In certain embodiments, network 230 may include at least certain portions of a public network, such as the Internet. Network 230 may be implemented using hardware, software, or various combinations thereof.

In certain embodiments, optical switch controller 222 may be further configured to interface with a person (a user) and receive data about intra data center optical switch 220. For example, optical switch controller 222 may also include or may be coupled to one or more input devices and output devices to facilitate receiving data about intra data center optical switch 220 from the user and to output results to the user. The one or more input or output devices (not shown) may include, but are not limited to, a keyboard, a mouse, a touchpad, a microphone, a display, a touchscreen display, an audio speaker, or the like. Alternately or additionally, optical switch controller 222 may be configured to receive data about intra data center optical switch 220 from a device such as another computing device or a network element, for example via network 230.

As shown in FIG. 3, in some embodiments, optical switch control module 302 may be configured to receive optical information concerning transmission paths in intra data center optical switch 220 and may also be responsible for discovery of this and other optical information concerning intra data center optical switch 220. In one or more embodiments, optical switch control module 302 may determine the N different optical wavelengths and optical transmission characteristics of optical signals received and output by wavelength exchanger 206, where the optical transmission characteristics are selected from at least one of: a modulation format, a baud rate, and optical power, or other optical transmission characteristics. In particular embodiments, optical switch control module 302 may populate a database 304 with the N different optical wavelengths, the optical transmission characteristics of optical signals, and features of intra data center optical switch 220 to support dynamic configuration of intra data center optical switch 220. In one or more embodiments, optical switch control module 302 may be configured to utilize the N different optical wavelengths, the optical transmission characteristics of optical signals, and features of intra data center optical switch 220 to configure components of intra data center optical switch 220, and in particular, configure optical combs 204, wavelength exchanger 206, and tunable filters 208 via control line 216. In one or more embodiments, optical switch controller 222 (see FIG. 2) may include one or more functionalities and/or one or more structures described with reference to optical switch controller 222.

Figure 4:
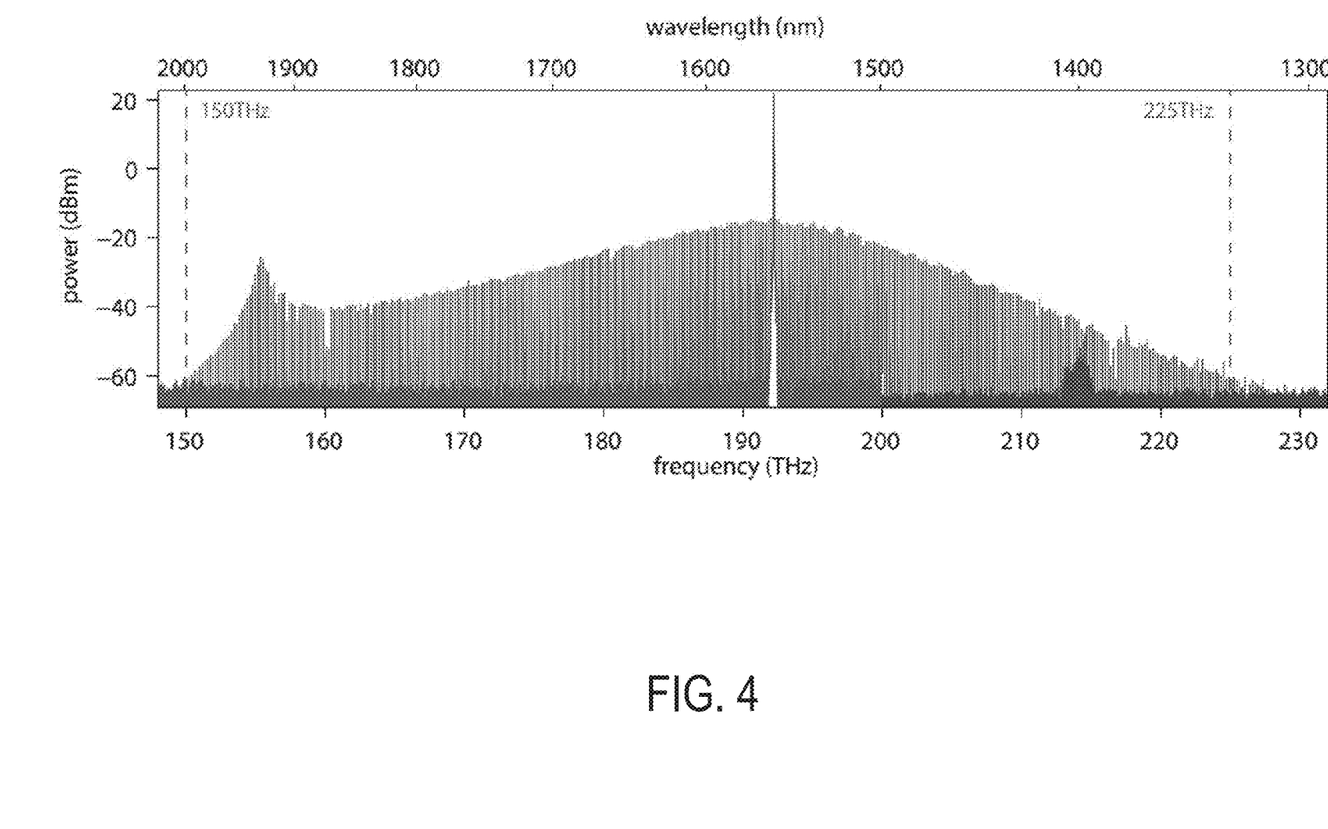
FIG. 4 shows selected elements of an embodiment of an optical frequency comb generated multi-wavelength power spectrum.

Referring now to FIG. 4, is a graph 400 illustrating an optical frequency comb of multiple wavelengths generated by an optical frequency comb generator. Graph 400 shows optical frequency comb generation of a 1,000 wavelength frequency comb, which may provide an optical comb 204 with the ability to optically transmit a data stream onto a 1,000 different wavelengths to generate an optical signal. Having 1,000 different wavelengths in an optical signal may allow each of a 1,000 data center systems 202 to communicate with each of the other 999 data center systems, which may enable 1,000:1,000 intra data center optical switch communication, as described above. A liquid crystal based WSS may cover a very wide optical bandwidth at least from 400 nm to 1,600 nm, which may also be able to generate 1,000 different wavelengths and enable 1,000:1,000 intra data center optical switch communication. Other optical frequency comb generators and other liquid crystal based WSSs may be able to generate even more wavelengths and support even higher levels of N:N intra data center optical switch communication.

Figure 5:
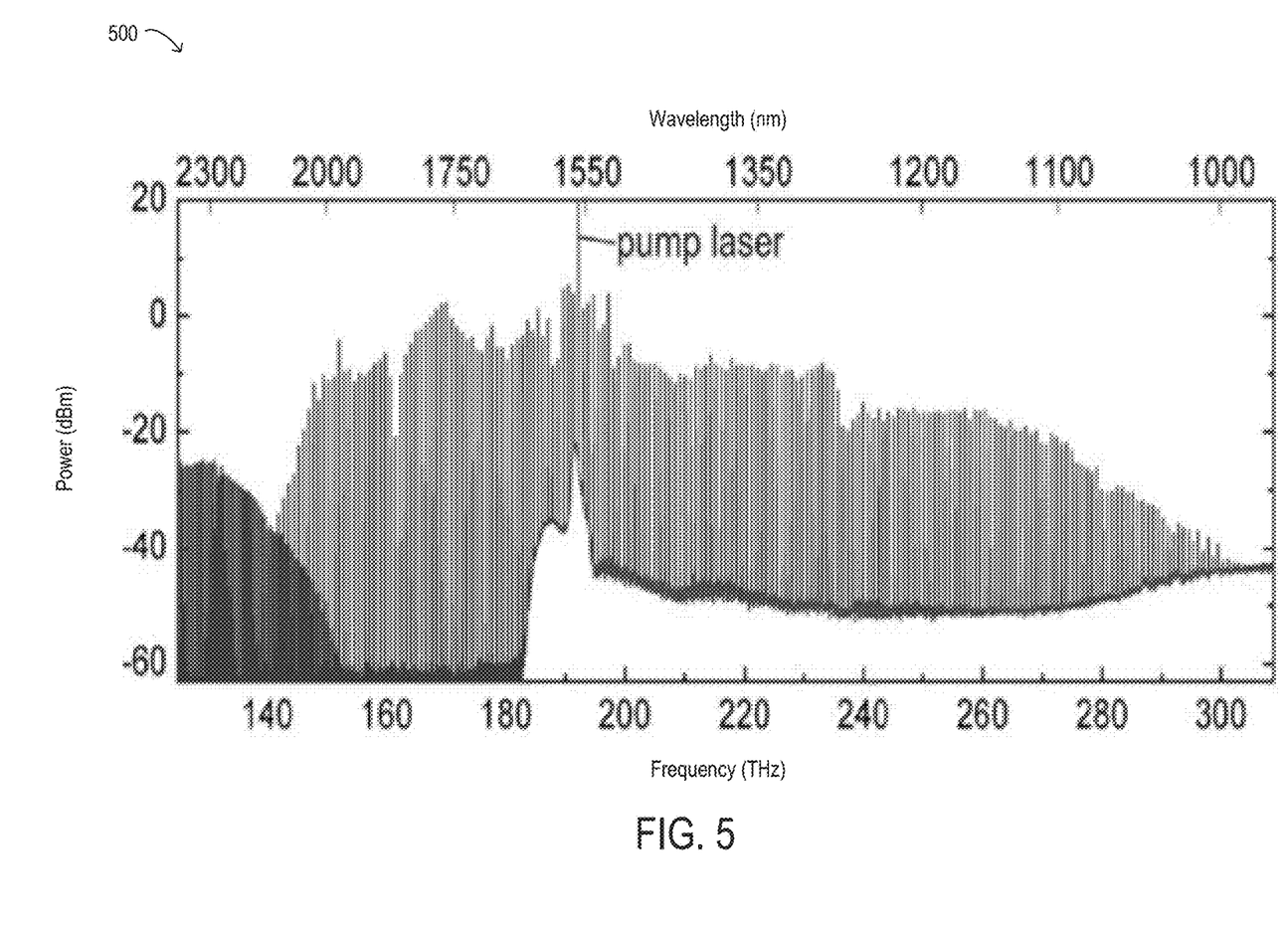
FIG. 5 shows selected elements of an embodiment of a distributed feedback laser source bank generated multi-wavelength power spectrum.

Referring now to FIG. 5, is a graph 500 illustrating multiple wavelengths generated by a distributed feedback (DFB) laser source bank. Graph 500 shows DFB laser source bank with the capability to generate more than a 1,000 wavelengths, which may support more than 1,000:1,000 intra data center optical switch communication, as previously described with reference to FIG. 4.

Figure 6:
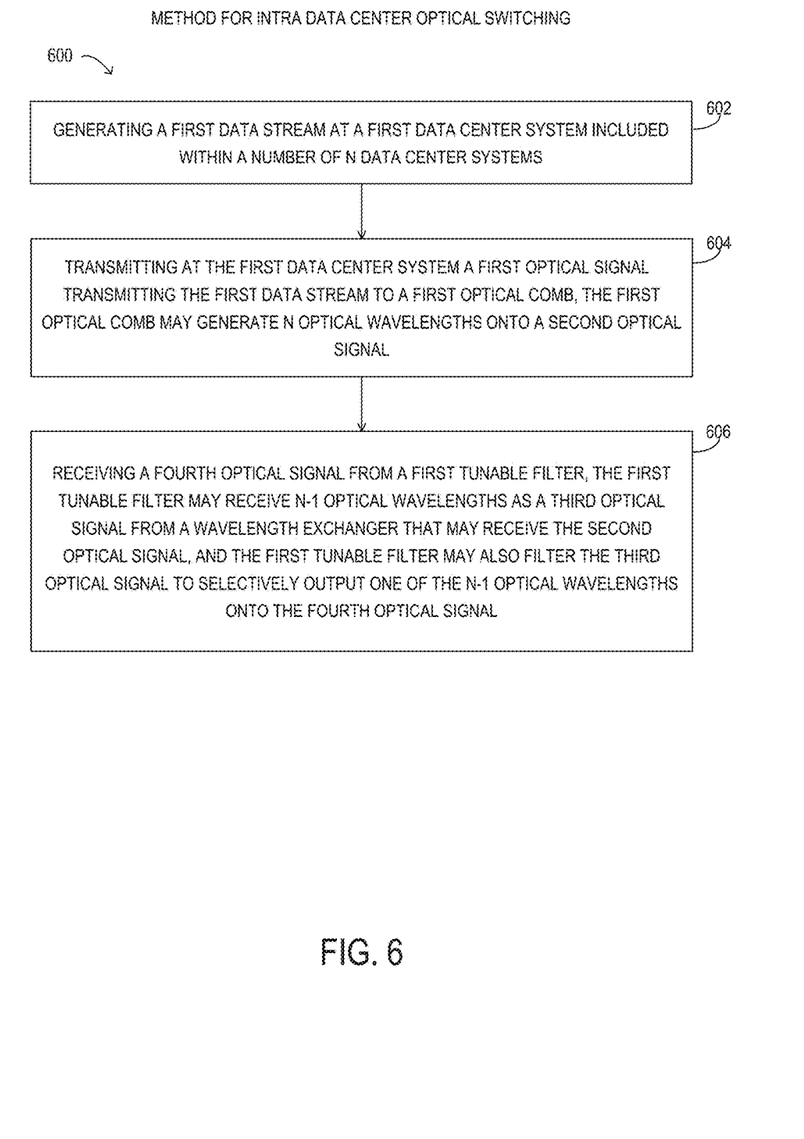
FIG. 6 a flowchart of selected elements of an embodiment of a method for intra data center optical switching.

Referring now to FIG. 6, a flowchart of selected elements of an embodiment of a method 600 for intra data center optical switching, as described herein, is depicted. In various embodiments, method 600 may be performed using intra data center optical switching system 200. It is noted that certain operations described in method 600 may be optional or may be rearranged in different embodiments.

Method 600 may begin at step 602, by generating a first data stream at a first data center system included within a number of N data center systems. The first data center system may be exclusively associated with a first optical comb and a first tunable filter, and N is greater or equal to two. At step 604, transmitting at the first data center system a first optical signal transmitting the first data stream to the first optical comb. The first optical comb may generate N different optical wavelengths onto a second optical signal and each of the N different optical wavelengths may transmit the first data stream. At step 606, receiving a fourth optical signal from the first tunable filter. The first tunable filter may receive N−1 different optical wavelengths as a third optical signal from a wavelength exchanger that may receive the second optical signal. The first tunable filter may also filter the third optical signal to selectively output one of the N−1 different optical wavelengths onto the fourth optical signal. The N−1 different optical wavelengths may correspond to N−1 data center systems excluding the first data center system.

As disclosed herein, methods and systems for intra data center optical switching of optical signals use an intra data center optical switch to optically transmit N optical wavelengths as an optical signal transmitting a data stream generated by a data center system included in N data center systems. The data center system may selectively receive one of N−1 optical wavelengths as another optical signal corresponding to one of N−1 other data center systems excluding the data center system from the intra data center optical switch. In this manner, intra data center optical switching may be performed without utilizing Ethernet and optical switches, which may result in reduced power consumption for data center communication.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An intra data center optical switching system comprising:
   a first optical comb;
   a wavelength exchanger;
   a first tunable filter; and
   a number of N data center systems including a first data center system exclusively associated with the first optical comb and the first tunable filter, wherein N is greater or equal to two, the first data center system configured to:
   generate a first data stream;
   transmit a first optical signal transmitting the first data stream to the first optical comb, the first optical comb configured to generate N optical wavelengths onto a second optical signal, wherein each of the N optical wavelengths transmit the first data stream; and
   receive a fourth optical signal from the first tunable filter that is configured to:
   receive N−1 optical wavelengths as a third optical signal from a wavelength exchanger configured to receive the second optical signal; and
   filter the third optical signal to selectively output one of the N−1 optical wavelengths onto the fourth optical signal, wherein the N−1 optical wavelengths correspond to N−1 data center systems excluding the first data center system.

2. The intra data center optical switching system of claim 1, the wavelength exchanger further configured to receive N optical signals, including the second optical signal, respectively from N optical combs respectively associated with the N data center systems.

3. The intra data center optical switching system of claim 1, the first data center system further configured to:
   receive the fourth optical signal and generate a second data stream corresponding to the fourth optical signal.

4. The intra data center optical switching system of claim 1, wherein each of the N−1 optical wavelengths transmit each of N−1 data streams corresponding to N−1 data center systems excluding the first data center system.

5. The intra data center optical switching system of claim 1, wherein the third optical signal includes at least some of the same wavelengths as included in the second optical signal.

6. The intra data center optical switching system of claim 1, the first data center system further configured to:
   receive an indication of a value for N for optical switching; and
   receive another indication of the other N−1 data center systems.

7. The intra data center optical switching system of claim 1, further comprising:
   an optical switch controller configured to control N tunable filters including the first tunable filter.

8. The intra data center optical switching system of claim 1, wherein the first tunable filter is a liquid crystal tunable filter.

9. The intra data center optical switching system of claim 1, wherein the first optical comb comprises at least one of a multiple distributed laser bank and a frequency comb generator.

10. The intra data center optical switching system of claim 1, wherein the wavelength exchanger comprises an arrayed waveguide grating and a liquid crystal on silicon.

11. The intra data center optical switching system of claim 1, wherein the wavelength exchanger comprises a wavelength selective switch.

12. A method for intra data center optical switching, the method comprising:
   generating a first data stream at a first data center system included within a number of N data center systems, wherein the first data center system exclusively associated with a first optical comb and a first tunable filter, and wherein N is greater or equal to two;

transmitting at the first data center system a first optical signal transmitting the first data stream to the first optical comb, wherein the first optical comb generates N optical wavelengths onto a second optical signal, and wherein each of the N optical wavelengths transmit the first data stream; and receiving a fourth optical signal from the first tunable filter, wherein the first tunable filter receives N−1 optical wavelengths as a third optical signal from a wavelength exchanger that receives the second optical signal, and filters the third optical signal to selectively output one of the N−1 optical wavelengths onto the fourth optical signal, and wherein the N−1 optical wavelengths correspond to N−1 data center systems excluding the first data center system.

13. The method of claim 12, wherein the wavelength exchanger further receives N optical signals, including the second optical signal, respectively from N optical combs respectively associated with the N data center systems.

14. The method of claim 12, further comprising:
receiving the fourth optical signal; and
generating a second data stream corresponding to the fourth optical signal.

15. The method of claim 12, wherein each of the N−1 optical wavelengths transmits each of N−1 data streams corresponding to N−1 data center systems excluding the first data center system.

16. The method of claim 12, wherein the third optical signal includes at least some of the same wavelengths as included in the second optical signal.

17. The method of claim 12, further comprising:
receiving an indication of a value for N for optical switching; and
receiving another indication of the other N−1 data center systems.

18. The method of claim 12, wherein an optical switch controller controls N tunable filters including the first tunable filter.

19. The method of claim 12, wherein the first tunable filter is a liquid crystal tunable filter.

20. The method of claim 12, wherein the first optical comb comprises at least one of a multiple distributed laser bank and a frequency comb generator.

* * * * *